US012461479B2

United States Patent
Morizaki et al.

(10) Patent No.: US 12,461,479 B2
(45) Date of Patent: Nov. 4, 2025

(54) HEATING DEVICE INCLUDING HEAT PIPE

(71) Applicant: FUJIFILM Business Innovation Corp., Tokyo (JP)

(72) Inventors: Sou Morizaki, Kanagawa (JP); Toru Inoue, Kanagawa (JP); Kazuyoshi Itoh, Kanagawa (JP); Toshiyuki Miyata, Kanagawa (JP); Motoharu Nakao, Kanagawa (JP); Kiyoshi Koyanagi, Kanagawa (JP); Toko Hara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 107 days.

(21) Appl. No.: 18/296,983

(22) Filed: Apr. 6, 2023

(65) Prior Publication Data

US 2023/0244176 A1 Aug. 3, 2023

Related U.S. Application Data

(63) Continuation of application No. 16/986,228, filed on Aug. 5, 2020, now Pat. No. 11,624,997.

(30) Foreign Application Priority Data

Mar. 27, 2020 (JP) ................................ 2020-058345

(51) Int. Cl.

| | |
|---|---|
| ***G03G 15/20*** | (2006.01) |
| ***G03G 15/00*** | (2006.01) |
| ***H05B 1/02*** | (2006.01) |

(52) U.S. Cl.

CPC ......... *G03G 15/80* (2013.01); *G03G 15/2046* (2013.01); *G03G 15/2053* (2013.01); *H05B 1/0241* (2013.01)

(58) Field of Classification Search

CPC .................................................. G03G 15/2053

See application file for complete search history.

(56) References Cited

U.S. PATENT DOCUMENTS

| | | | |
|---|---|---|---|
| 8,644,746 | B2 | 2/2014 | Maruyama et al. |
| 8,953,996 | B2 | 2/2015 | Maruyama et al. |
| 9,477,189 | B1 | 10/2016 | Yagi et al. |

FOREIGN PATENT DOCUMENTS

| | | |
|---|---|---|
| JP | S61110982 | 7/1986 |
| JP | H0989480 | 4/1997 |

(Continued)

OTHER PUBLICATIONS

"Office Action of Japan Counterpart Application", issued on Jan. 9, 2024, with English translation thereof, p. 1-p. 5.

(Continued)

*Primary Examiner* — Arlene Heredia
(74) *Attorney, Agent, or Firm* — JCIPRNET

(57) ABSTRACT

A heating device is provided. The heating device includes a heating unit, heating a member to be heated, which is transported, and a contact portion of the heating unit contacting with the member to be heated; a heat pipe, having a first end and a second end opposite to the first end in a widthwise direction, and contacting with a portion of the heating unit different from the contact portion so as to extend in the widthwise direction crossing a transport direction of the member to be heated; a rotating body, rotating so as to press the member to be heated; and a power input unit, having a gear disposed on a second end side of the heat pipe and inputting a rotational force at least to the rotating body. The first end of the heat pipe has a thickness smaller than that of the second end.

2 Claims, 8 Drawing Sheets

(56) References Cited

FOREIGN PATENT DOCUMENTS

| | | |
|---|---|---|
| JP | H1074008 | 3/1998 |
| JP | 2006039049 | 2/2006 |
| JP | 2008058757 | 3/2008 |
| JP | 2011186468 | 9/2011 |
| JP | 2012113243 | 6/2012 |
| JP | 6062503 | 1/2017 |

OTHER PUBLICATIONS

"Office Action of Japan Counterpart Application", issued on May 7, 2024, with English translation thereof, p. 1-p. 5.
"Notice of Reasons for Refusal of Japan Counterpart Application", issued on Apr. 22, 2025, with English translation thereof, pp. 1-6.

HEATING DEVICE INCLUDING HEAT PIPE

CROSS REFERENCE TO RELATED APPLICATION

This application is a continuation of and claims the priority benefits of U.S. patent application Ser. No. 16/986,228, filed on Aug. 5, 2020, now allowable, and claims priority from Japanese Patent Application No. 2020-058345 filed on Mar. 27, 2020. The entire disclosures of which are incorporated herein by reference.

BACKGROUND

(i) Technical Field

The present disclosure relates to a heating device and an apparatus using a member to be heated.

(ii) Related Art

In the related art, the device described in Japanese Unexamined Patent Application Publication No. 2004-235001 (claim 2, FIG. 1, FIG. 4, etc.) and the device described in Japanese Unexamined Patent Application Publication No. 2013-142834 (claim 3, FIG. 3, etc.) are known as examples of a heating device that includes a heat pipe.

Japanese Unexamined Patent Application Publication No. 2004-235001 describes a heating device that includes a heating unit, a film member that has an endless loop shape and that is disposed so as to be freely movable while having sliding contact with the heating unit, a pressing unit that is disposed so as to be pressed into contact with the heating unit with the film member interposed therebetween, a heat equalizing member such as a heat pipe that is disposed at a position downstream from the heating unit in a direction of movement of the film member so as to be pressed into contact with the pressing unit with the film member interposed therebetween, a temperature detection unit that detects the temperature of the heating unit, and an energy control unit that controls energy that is supplied to the heating unit. In the heating device, a member to be heated is caused to pass through a press-contact portion that is formed by pressing the heating unit and the heat equalizing member into contact with the pressing unit with the film member interposed therebetween, and thermal energy from the heating unit is applied to the member to be heated via the film member.

Japanese Unexamined Patent Application Publication No. 2013-142834 describes a heating unit in which a heating element is printed on a substrate that is formed of a plate-shaped heat pipe with an insulating layer interposed between the heating element and the substrate. The outermost surface is coated with an insulating layer, and at least one surface of the heat pipe is formed in a recessed manner. The heating element is printed on a surface of the heat pipe that is opposite to the recessed surface of the heat pipe with the insulating layer interposed between the heating element and the surface of the heat pipe, and the uppermost surface is coated with the insulating layer.

SUMMARY

Aspects of non-limiting embodiments of the present disclosure relate to providing a heating device and an apparatus using a member to be heated that are capable of suppressing breakage of crimped portions of heat pipes due to load concentrated at the crimped portions compared with the case where a power input unit is disposed on one end side of the heat pipes on which the crimped portions are formed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heating device including a heating unit that is configured to heat a member to be heated, which is transported, as a result of a contact portion of the heating unit being in contact with the member to be heated; a heat pipe that configured to have a first end and a second end opposite to the first end in a widthwise direction, and contact with a portion of the heating unit different from the contact portion in such a manner as to extend in the widthwise direction crossing a transport direction of the member to be heated; a rotating body that configured to rotate in such a manner as to press the member to be heated; and a power input unit, comprising a gear, that is disposed on a second end side of the heat pipe and that configured to input a rotational force at least to the rotating body, wherein the first end of the heat pipe has a thickness smaller than that of the second end.

BRIEF DESCRIPTION OF THE DRAWINGS

An exemplary embodiment of the present disclosure will be described in detail based on the following figures, wherein.

DESCRIPTION OF THE PREFERRED EMBODIMENTS

An exemplary embodiment of the present disclosure will be described below with reference to the drawings.

EXEMPLARY EMBODIMENT

Figure 1:
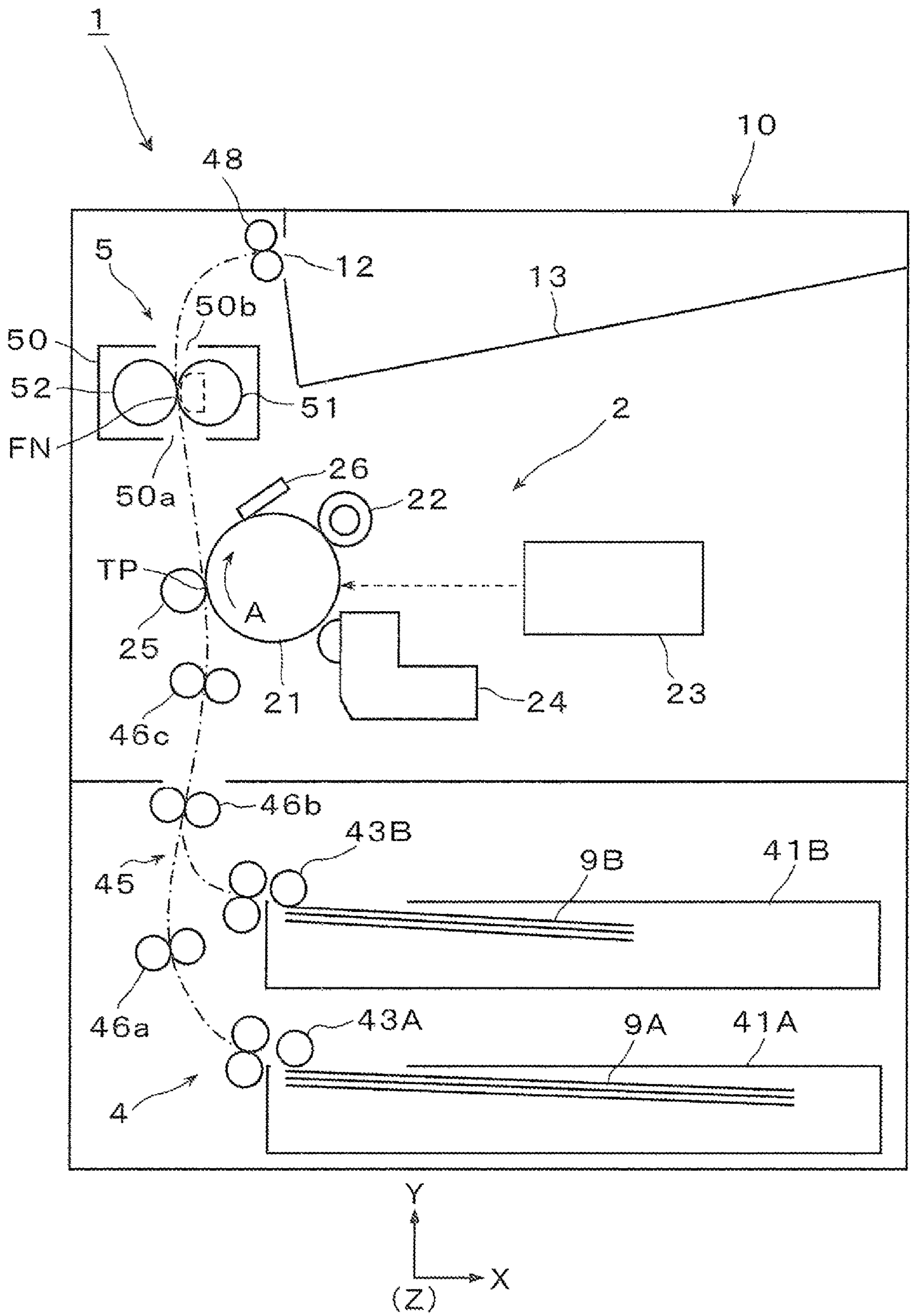
FIG. 1 is a schematic diagram illustrating an image forming apparatus according to the exemplary embodiment.
Figure 2:
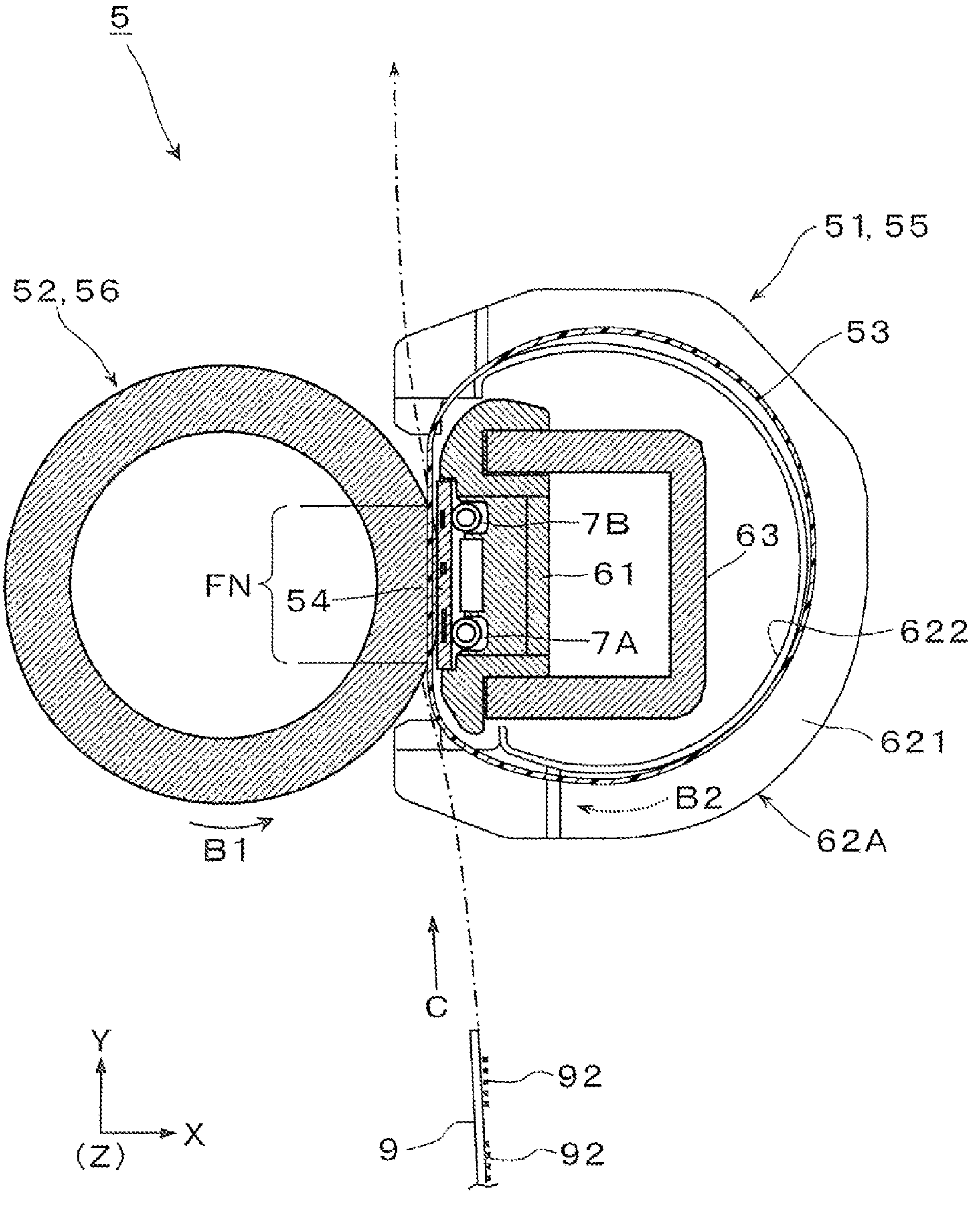
FIG. 2 is a cross-sectional schematic view illustrating a heating device according to the exemplary embodiment.

FIG. 1 and FIG. 2 illustrate a configuration example of the exemplary embodiment of the present disclosure. FIG. 1 illustrates an image forming apparatus 1 according to the exemplary embodiment, and FIG. 2 illustrates a heating device 5 according to the exemplary embodiment.

In FIG. 1, FIG. 2, and the other drawings, a transverse direction (horizontal direction), a top-bottom direction (vertical direction), and a longitudinal direction (horizontal direction) are respectively indicated by arrows X, Y, and Z. In some of the drawings, a circle mark illustrated at a position where arrows X and Y cross each other indicates that the direction of arrow Z is oriented downward in a direction perpendicular to the plane in the drawings.

<Image Forming Apparatus>

The image forming apparatus 1 illustrated in FIG. 1 is an apparatus that performs image formation by forming images formed of a developer onto sheets 9 and then heating the sheets 9. The developer is an example of a powder, and each of the sheets 9 is an example of a member to be heated. The image forming apparatus 1 corresponds to an example of an apparatus using a member to be heated, which is an apparatus that uses a member to be heated.

As illustrated in FIG. 1, the image forming apparatus 1 according to the exemplary embodiment include a housing 10 the appearance of which has a desired shape. An image forming device 2, a sheet feeding device 4, the heating device 5, and so forth are arranged in the internal space of the housing 10. In FIG. 1, a transport path that is used when the sheets 9 are transported in the housing 10 is indicated by a one-dot chain line.

The image forming device 2 is a device that forms toner images by using a toner serving as a developer and transfers the toner images onto the sheets 9. The image forming device 2 includes a photoconductor drum 21 that rotates in the direction of arrow A, and units such as a charging unit 22, an exposure unit 23, a developing unit 24, a transfer unit 25, and a cleaning unit 26 are arranged around the photoconductor drum 21.

The photoconductor drum 21 is an example of an image holding unit and is a drum-shaped photoconductor that has a photosensitive layer serving as an image forming surface and as an image holding surface. The charging unit 22 is a unit that charges the outer peripheral surface (image forming surface) of the photoconductor drum 21 to a required surface potential. For example, the charging unit 22 includes a charging member that is brought into contact with the outer peripheral surface (image forming surface) of the photoconductor drum 21 and that is supplied with a charging current, the charging member having, for example, a roll-like shape.

The exposure unit 23 is a unit that exposes the outer peripheral surface of the photoconductor drum 21, which has been charged, to light on the basis of image information so as to form an electrostatic latent image. The exposure unit 23 operates by receiving an image signal that is generated as a result of an image processing unit or the like (not illustrated) performing a required processing operation on image information that is input from the outside. The image information is, for example, information related to an image to be formed such as a character, a figure, a photograph, or a pattern. The developing unit 24 is a unit that develops an electrostatic latent image formed on the outer peripheral surface of the photoconductor drum 21 with a developer (toner) of a corresponding predetermined color (e.g., black) into a visible monochromatic color toner image.

Next, the transfer unit 25 is a unit that electrostatically transfers a toner image formed on the outer peripheral surface of the photoconductor drum 21 onto one of the sheets 9. The transfer unit 25 includes a transfer member that is brought into contact with the outer peripheral surface of the photoconductor drum 21 and that is supplied with a transfer current, the transfer member having, for example, a roll-like shape. The cleaning unit 26 is a unit that cleans the outer peripheral surface of the photoconductor drum 21 by removing unwanted substances such as undesirable toner and paper dust deposited on the outer peripheral surface of the photoconductor drum 21.

In the image forming device 2, a portion where the photoconductor drum 21 and the transfer unit 25 face each other corresponds to a transfer position TP at which a transfer operation for toner images is performed.

The sheet feeding device 4 is a device that accommodates and sends out the sheets 9 that are to be supplied to the transfer position TP in the image forming device 2. The sheet feeding device 4 includes units such as one or more accommodating units 41 that accommodate the sheets 9 and one or more delivery units 43 that send out the sheets 9.

The one or more accommodating units 41 are accommodating members each of which includes a stacking plate (not illustrated) on which the plurality of sheets 9 are stacked in a desired orientation so as to be accommodated in the accommodating member. The one or more delivery units 43 are units that send out the sheets 9 stacked on the stacking plates of the one or more accommodating units 41 one by one by using members such as a plurality of rollers. For example, the sheet feeding device 4 in the exemplary embodiment includes two accommodating units 41A and 41B capable of individually accommodating sheets 9A and 9B that have different widths at transportation and two delivery units 43A and 43B that send out the sheets 9A, which are accommodated in the accommodating unit 41A, and the sheets 9B, which are accommodated in the accommodating unit 41B, individually.

The sheet feeding device 4 is connected to the transfer position TP in the image forming device 2 by a sheet-feeding transport path 45 that is an example of a transport unit. The sheet-feeding transport path 45 is a sheet-transport path that transports and feeds the sheets 9 (9A or 9B) sent out from the sheet feeding device 4 to the transfer position TP and is provided with a plurality of transport rollers 46*a* and 46*b* that transport each of the sheets 9 by nipping the sheet 9, a plurality of guide members (not illustrated) that secure a space in which the sheets 9 are transported and guide transportation of the sheets 9.

The sheets 9 may be sheet-shaped recording media that are capable of being transported in the housing 10 and that allow toner images to be transported and thermally fixed thereto, and the material, the form, and so forth of the sheets 9 are not particularly limited.

The heating device 5 is a device that performs heating and pressurizing treatments in order to fix a toner image, which is an unfixed image transferred to one of the sheets 9 at the transfer position TP in the image forming device 2, onto the sheet 9. In the heating device 5, units such as a rotating body 51 for the heating treatment (hereinafter referred to as heating-rotating body 51) and a rotating body 52 for the pressurizing treatment (hereinafter referred to as pressurizing-rotating body 52) are arranged in an internal space of a housing 50 that has an introduction port 50*a* and an ejection port 50*b* for the sheets 9.

In the heating device 5, as illustrated in FIG. 1 and FIG. 2, the heating-rotating body 51 and the pressurizing-rotating body 52 are arranged so as to rotate while being in contact with each other and apply heat and pressure to each of the sheets 9 or the like that passes through a contact area FN where the heating-rotating body 51 and the pressurizing-rotating body 52 are in contact with each other.

Details of the heating device 5 will be described later.

In the image forming apparatus 1, for example, image formation is performed in the following manner.

In the image forming apparatus 1, when a control unit (not illustrated) receives a command for an image forming operation, a charging operation, an exposure operation, a developing operation, and a transfer operation are performed in the image forming device 2. Meanwhile, the sheet feeding device 4 performs a sheet feeding operation for sending out a desired one of the sheets 9 (9A or 9B), transporting the sheet 9 along the sheet-feeding transport path 45, and feeding the sheet 9 to the transfer position TP.

As a result, a toner image according to image information is formed on the photoconductor drum 21, and the toner image is transferred onto the sheet 9, which has been fed to the transfer position TP from the sheet feeding device 4. In this case, the sheet 9 to which the toner image has been transferred is separated from the photoconductor drum 21 while being nipped between the photoconductor drum 21 and the transfer unit 25, which are rotating, and is sent out toward the heating device 5.

Subsequently, in the heating device 5 of the image forming apparatus 1, when the sheet 9 to which toner images 92 have been transferred is introduced into the above-mentioned contact area FN so as to pass through the contact area FN as illustrated in FIG. 2, a fixing operation for applying heat and pressure to the sheet 9 is performed. As a result, the unfixed toner images 92 melt under pressure and are fixed onto the sheet 9. In this case, the heating-rotating body 51 and the pressurizing-rotating body 52 function as transport units that transport the sheet 9.

The sheet 9 to which the toner images 92 have been fixed is ejected from the housing 50 while being nipped between the heating-rotating body 51 and the pressurizing-rotating body 52 in the heating device 5 and then transported to an ejection port 12 through a sheet-ejection transport path. Finally, the sheet 9 is sent out, by an ejection roller 48, to an ejected-sheet-accommodating unit 13 that is formed in a portion of the housing 10 so as to be accommodated in the ejected-sheet-accommodating unit 13.

In the manner described above, a basic image forming operation for forming a monochromatic image onto a surface of one of the sheets 9 that is performed by the image forming apparatus 1 is completed.

<Heating Device>

The heating device 5 will now be described in detail.

Figure 3:
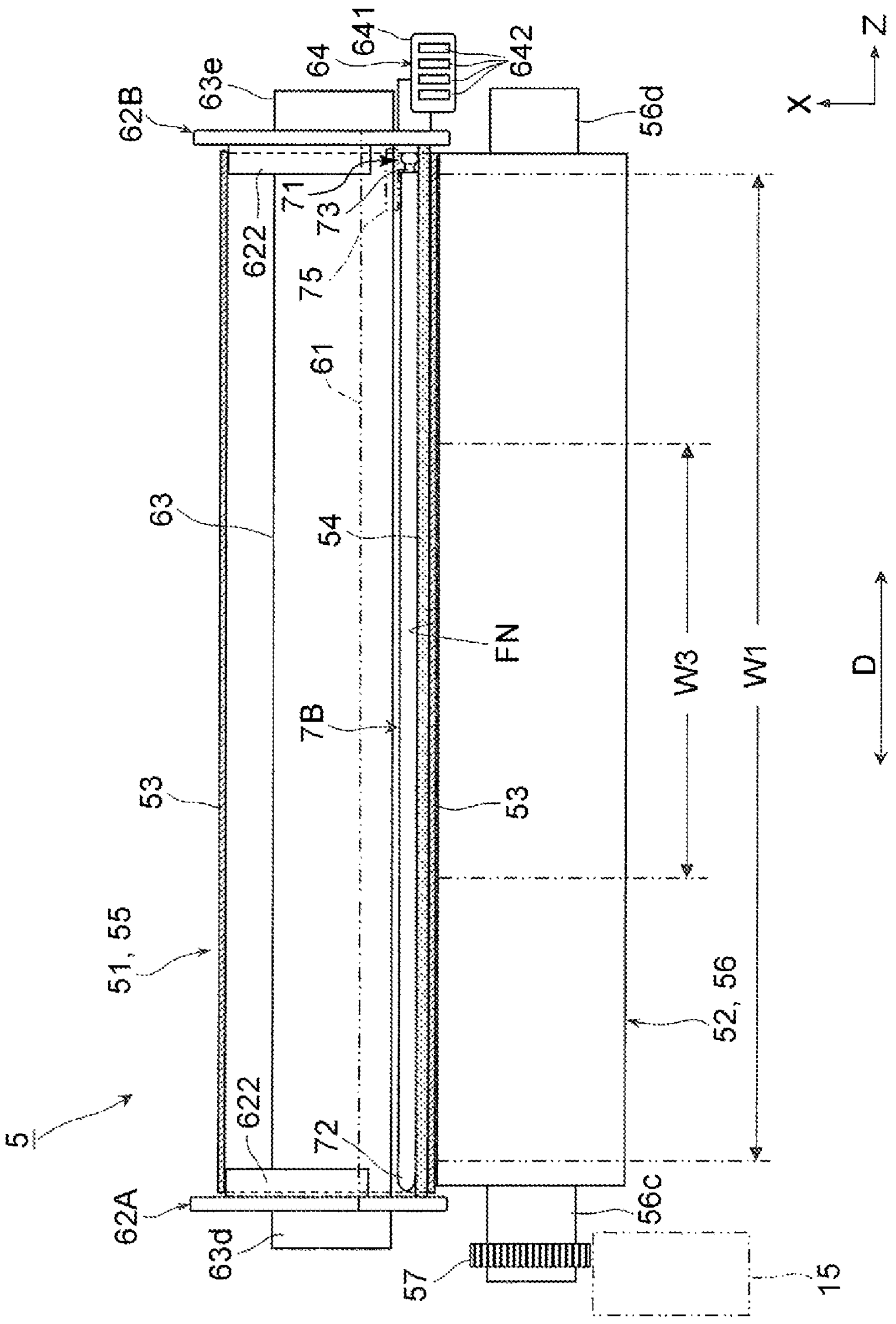
FIG. 3 is a partially cross-sectional schematic view illustrating the heating device in FIG. 2 while omitting illustration of a portion of the heating device.

In the heating device 5 according to the exemplary embodiment, as illustrated in, for example, FIG. 2 and FIG. 3, a belt-nip-type heating unit 55 is used as the above-mentioned heating-rotating body 51, and a pressure roller 56 having a roll-like shape is used as the above-mentioned pressurizing-rotating body 52. The belt-nip-type heating unit 55 includes a heating belt 53 that is rotatable and a heat-generating element 54 that is an example of a heating unit, and the heat-generating element 54 presses the heating belt 53 against the pressurizing-rotating body 52 from a space enclosed by the heating belt 53 so as to form the contact area (nip) FN and generates heat so as to heat each of the sheets 9.

The heating unit 55 is a unit including a portion (an example of a contact portion) of the heat-generating element 54 that heats, at the contact area FN, the sheets 9 in a widthwise direction D of the sheets P (see, for example, FIG. 3) that crosses a transport direction C of the sheets 9.

In the heating unit 55, the heat-generating element 54 is held by a contact holder 61 so as to be in contact with the inner peripheral surface of the heating belt 53, and the heating belt 53 is rotatably held by a portion of the contact holder 61 and left and right end holders 62A and 62B. In addition, in the heating unit 55, the contact holder 61 and the left and right end holders 62A and 62B are supported by a support 63.

The heating belt 53 is an endless heat conducting belt that has flexibility and heat resistance. For example, a belt that is formed so as to have a cylindrical original shape by using, for example, a synthetic resin such as a polyimide or polyamide is used as the heating belt 53.

The heat-generating element 54 includes a substrate 541, a plurality of (three in the exemplary embodiment) heating portions 542A, 542B, and 542C that are provided in a first surface 541*a* of the substrate 541 that is in contact with the inner peripheral surface of the heating belt 53, and a wiring unit 543 for supplying power to the heating portions 542A, 542B, and 542C.

The substrate 541 is a plate-shaped member that has a rectangular shape having a width size W larger than a maximum size W1 in the widthwise direction D crossing the transport direction C of the sheets 9. The substrate 541 is made of a material having an electrical insulating property, and for example, a substrate made of a ceramic is used as the substrate 541. The surface (first surface) 541*a* of the substrate 541, which is in contact with the inner peripheral surface of the heating belt 53, is coated with a coating layer after the heating portions 542A, 542B, and 542C have been arranged in the front surface 541*a*.

Figure 6A:
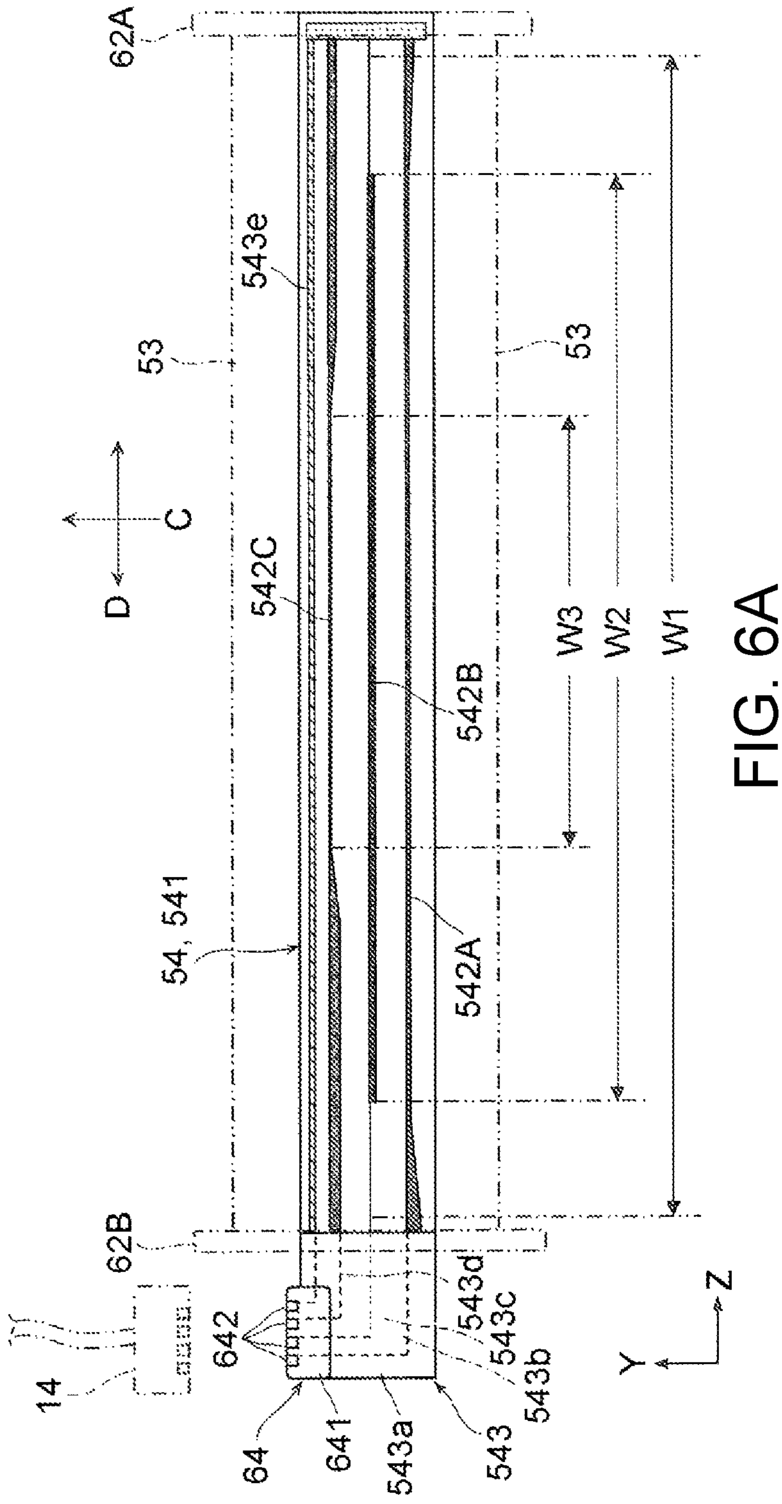
FIG. 6A and FIG. 6B are respectively a schematic diagram illustrating a portion of the heating unit and a schematic diagram illustrating a heat pipe.

As illustrated in FIG. 6A, the heating portions 542A, 542B, and 542C are electrically-heated wire members that are arranged in the first surface 541*a* of the substrate 541 so as to linearly extend in the longitudinal direction of the substrate 541, which is the same as the widthwise direction D of the sheets 9, and so as to be spaced apart from one another and parallel to one another in the widthwise direction D of the sheets 9.

FIG. 6A is a diagram illustrating the state viewed from a surface (second surface) 541*b* of the substrate 541 of the heat-generating element 54 that is opposite to the first surface 541*a*, and thus, the heating portions 542, which are provided on the side of the first surface 541*a*, are actually not visible. However, in FIG. 6A, the heating portions 542 are illustrated in a see-through manner from the side of the second surface 541*b* for convenience of description of the heating portions 542.

Although the heating portions 542A, 542B, and 542C have the same length in the longitudinal direction of the substrate 541, each of the heating portions 542A, 542B, and 542C has a region in which the amount of heat generation is relatively large, and these regions are located at different positions so as to accommodate variations in the width size W among the sheets 9 at transportation.

In other words, a center portion of the first heating portion 542A excluding the two end portions of the first heating portion 542A in the longitudinal direction is the region in which the amount of heat generation is relatively large. The first heating portion 542A is used when one of the sheets 9 whose width size W is an intermediate size W2 (<W1) passes through the contact area FN. Portions of the second heating portion 542B that correspond to the two end portions of the first heating portion 542A are each the region in which the amount of heat generation is relatively large. A center portion of the third heating portion 542C in the longitudinal direction (e.g., a portion that is about one-third of the entire length of the third heating portion 542C) is the region in which the amount of heat generation is relatively large. The third heating portion 542C is used when one of the sheets 9 whose width size W is a minimum size W3 (<W2) passes through the contact area FN.

Note that, in the exemplary embodiment, the regions of the heating portions 542A, 542B, and 542C in each of which the amount of heat generation is relatively large have configurations for the case of employing a center reference transport system (a center registration system) in which each of the sheets 9 is guided and transported such that the center position of the sheet 9 in the widthwise direction D of the sheet 9 at transportation passes, for example, a reference center position of the width of a region in the above-mentioned contact area FN of the heating device 5 through which the sheet 9 passes.

In addition, the regions of the heating portions 542A, 542B, and 542C in each of which the amount of heat generation is relatively large are each formed by, for example, setting at least one of the width and the thickness of a portion of each of the electrically heated wire members, the portion corresponding to the region, to be narrower, thinner, or narrower and thinner than the other portion (a portion in which heat generation is suppressed) of the electrically heated wire member such that the electrical resistance of the portion corresponding to the region is relatively high.

The temperature of the heat-generating element 54 that depends on the amount of heat generated by the heating portions 542A, 542B, and 542C is measured by a temperature sensor (not illustrated) that is disposed so as to be in contact with a necessary portion of the rear surface 541*b* of the substrate 541 of the heat-generating element 54, and the measurement information is fed back to a heating control unit (not illustrated).

As illustrated in, for example, FIG. 6A, the wiring unit 543 is disposed in such a manner that a line concentrating portion thereof is positioned at one end of the heat-generating element 54 in the longitudinal direction of the heat-generating element 54 and located outside one of the end holders 62A and 62B. The wiring unit 543 in the exemplary embodiment is configured as one of the end portions of the substrate 541, the one end portion being extended to the outside of the right end holder 62B.

The wiring unit 543 includes a substrate 543*a* having an electrical insulating property, individual wiring portions 543*b*, 543*c*, and 543*d* each of which is individually connected to one end of a corresponding one of the heating portions 542A, 542B, and 542C as indicated by a dashed line in FIG. 6A, and a common wiring portion 543*e* that is commonly connected to the other ends of the heating portions 542A, 542B, and 542C as indicated by a dot pattern and a dashed line in FIG. 6A.

As illustrated in, for example, FIG. 3, the heat-generating element 54 is connected to the wiring unit 543 and also to a power-supply connection unit 64 that supplies power to the heating portions 542.

The power-supply connection unit 64 in the exemplary embodiment includes a connection housing (connector body) 641 that has a detachable shape and a plurality of contact terminals 642 that are arranged on one side surface of the housing 641 so as to be connected to connection ends of the wiring lines of the wiring unit 543 and so as to be exposed at the side surface.

For example, as illustrated in FIG. 6A, the power-supply connection unit 64 may be energized by being connected to a power-supply source connection unit 14 that is extended and routed from a power supplying unit (not illustrated) that is disposed in the image forming apparatus 1.

The power-supply connection unit 64 is positioned so as to be connectable to the connection ends of the wiring lines of the wiring unit 543 and so as to be located outside one of the left and right end holders 62A and 62B. In the exemplary embodiment, as illustrated in, for example, FIG. 3, FIG. 5, and FIG. 6, the power-supply connection unit 64 is located outside the right end holder 62B and is disposed at, for example, one end of the wiring unit 543 of the heat-generating element 54 or one end of the contact holder 61.

Figure 5:
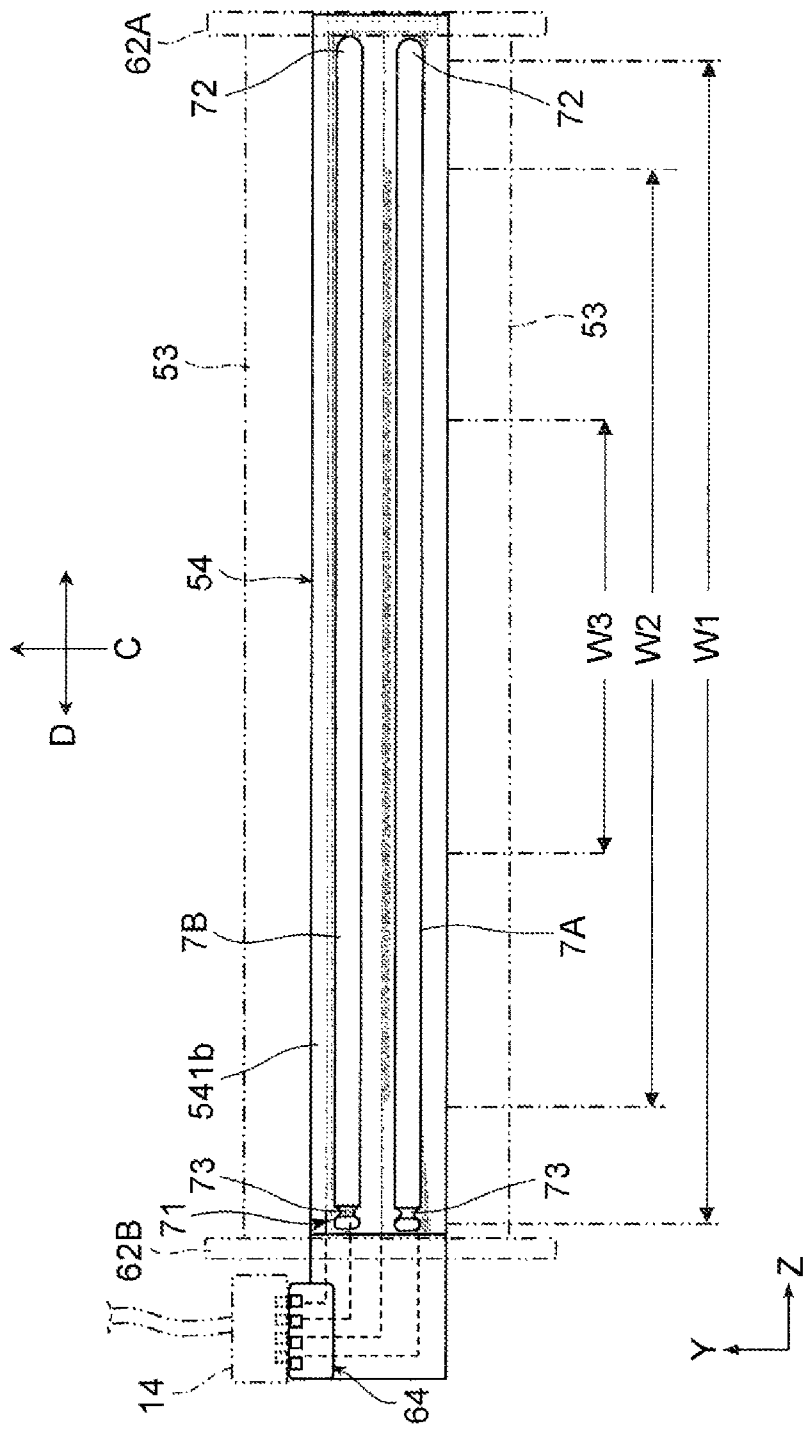
FIG. 5 is a schematic diagram illustrating a portion of the heating device in FIG. 2.

In particular, as illustrated in FIG. 5 and FIG. 6A, this power-supply connection unit 64 is provided in order to enable the heating unit 55 to heat each of the sheets 9 or the like that is transported from the lower side to the upper side in the transport direction C in such a manner as to pass through the contact area FN, and thus, the power-supply connection unit 64 is disposed at a position corresponding to the upper end of the heating unit 55. More specifically, the power-supply connection unit 64 is disposed at one end of the wiring unit 543 of the heat-generating element 54 or one end of the contact holder 61, the one end being located on the downstream side in the transport direction C (corresponding to the upper side).

The contact holder 61 is a plate-shaped member that is long in one direction and that has an accommodating recess 61*a* formed in a first surface of the contact holder 61, the first surface being located on the side on which the heat-generating element 54 is brought into contact with the inner peripheral surface of the heating belt 53, and the heat-generating element 54 is accommodated and held in the accommodating recess 61*a*.

In addition, the contact holder 61 has an attachment groove 61*b* and an attachment contact portion 61*c* formed in a second surface of the contact holder 61 opposite to the above first surface, and the attachment groove 61*b* and the attachment contact portion 61*c* are used when the contact holder 61 is attached to the support 63.

Furthermore, in the contact holder 61, one of the long sides of the first surface, in which the accommodating recess 61*a* is formed, has an end portion formed as an introduction guide portion 61*d* that has a bent surface and guides the heating belt 53 such that the heating belt 53 is introduced into the contact area FN, and the other long side of the first surface has an end portion formed as an exit guide portion 61*e* that has a curved surface and guides the heating belt 53 in a direction in which the heating belt 53 exits from the contact area FN.

Each of the left and right end holders 62A and 62B is a member that includes a body 621 having a circular plate-like shape, a portion of the body 621 that faces the pressure roller 56 being partially cut out, and a belt guiding-and-holding portion 622 having a curved shape is provided on the inner surface of the body 621. The belt guiding-and-holding portion 622 guides and holds, from the space enclosed by the heating belt 53, the two widthwise end portions of the heating belt 53 such that the heating belt 53 is rotatable. In addition, in each of the left and right end holders 62A and 62B, an attachment recess (not illustrated) that is attached to an end portion of the support 63 is formed on the inner side of the belt guiding-and-holding portion 622 provided on the body 621.

Figure 4A:
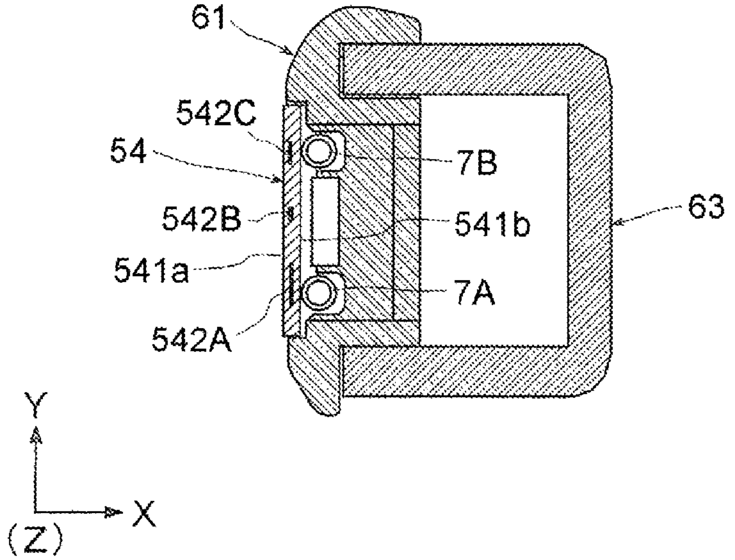
FIG. 4A and FIG. 4B are respectively a cross-sectional schematic view illustrating a portion of a heating unit that is applied to the heating device in FIG. 2 and an exploded view of the heating unit illustrated in FIG. 4A.

As illustrated, for example, FIG. 3, the support 63 is a member having a length larger than that of the heat-generating element 54 in the longitudinal direction. As illustrated, for example, FIG. 4A, a flat-plate member that is, for example, long in one direction and that has two long-side end portions each bent in the same direction substantially perpendicular to the flat-plate member such that the flat-plate member is U-shaped in cross-section is used as the support 63.

Figure 4B:
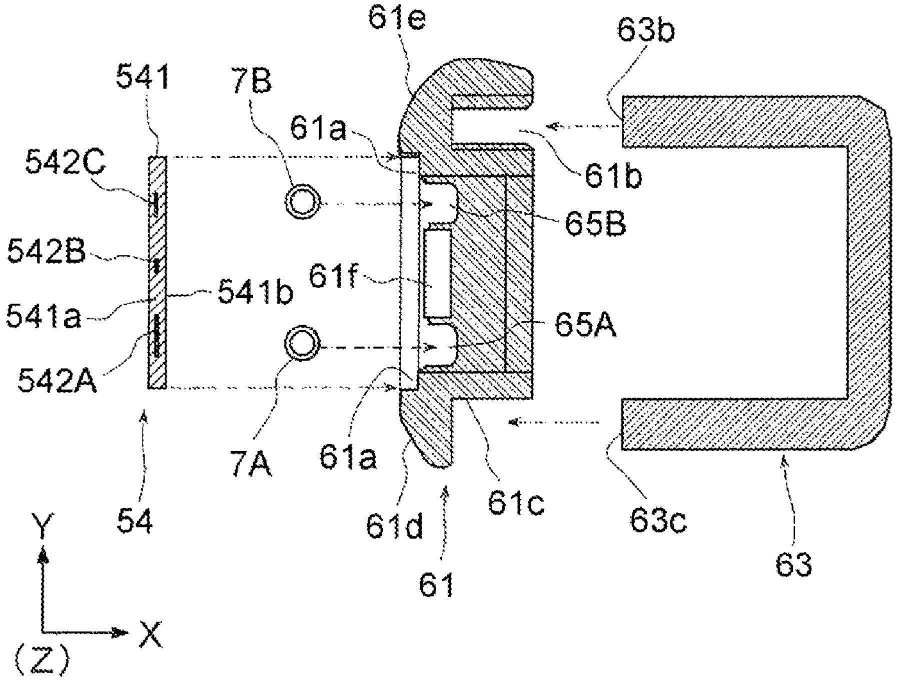

When the support 63 is attached to the contact holder 61, as illustrated in, for example, FIG. 4B, a first bent end portion 63*b* of the support 63 is fitted into the attachment groove 61*b* of the contact holder 61, and a second bent end portion 63*c* of the support 63 is maintained in contact with the attachment contact portion 61*c* of the contact holder 61. As a result, the support 63 supports the contact holder 61 while nipping a portion of the contact holder 61 in the longitudinal direction.

For example, the heating unit 55 is assembled in the following manner.

First, the contact holder 61 on which the heat-generating element 54 has been mounted is attached to the bent end portions 63*b* and 63*c* of the support 63, and they are placed in the space enclosed by the heating belt 53. Then, the left and right end holders 62A and 62B are positioned slightly further inside than the two end portions of the support 63 in the longitudinal direction in such a manner as to sandwich the heating belt 53 from both end sides of the heating belt 53. In this case, as illustrated in FIG. 6A, the left and right end holders 62A and 62B are arranged at the ends of the heating portions 542 of the heat-generating element 54 or positioned further outside than the ends of the heating portions 542.

As a result, the heating unit 55 is assembled. The heating unit 55 is disposed in the heating device 5 by attaching and fixing longitudinal end portions 63*d* and 63*e* of the support 63 onto mounting portions (not illustrated) that are provided on the inner wall surface of the housing 50.

Subsequently, as the pressure roller 56 serving as the pressurizing-rotating body 52, for example, a member formed by forming an elastic body layer, a release layer, and so forth over the outer peripheral surface of a roller base that is made of a metal or the like and that has a columnar shape or a cylindrical shape is used.

As illustrated in FIG. 3, the pressure roller 56 includes shaft portions 56*c* and 56*d* formed at the two ends in the axial direction of the pressure roller 56, and the shaft portions 56*c* and 56*d* are supported so as to be rotatable with respect to a pressing mechanism (not illustrated) that is provided on or in the housing 50. The pressing mechanism applies pressure to the pressure roller 56 so as to press the pressure roller 56 against the heating unit 55. As a result, as illustrated in FIG. 2 and FIG. 3, the outer peripheral surface of the pressure roller 56 is kept pressed into contact with the first surface 541*a* of the heat-generating element 54 in the longitudinal direction at a predetermined pressure with the heating belt 53 of the heating unit 55 interposed between the pressure roller 56 and the heat-generating element 54.

The portion at which the pressure roller 56 is pressed in contact with the heating unit 55 corresponds to the above-mentioned contact area FN.

As illustrated in FIG. 3, a power receiving gear 57, which is an example of a drive input unit, is attached to the shaft portion 56*c* of the pressure roller 56, and the power receiving gear 57 engages a power receiving gear (not illustrated) in a drive transmission device 15 that is disposed on the side of the housing 10 of the image forming apparatus 1. As a result, as illustrated in FIG. 2, a force that causes the pressure roller 56 to rotate is transmitted and input to the pressure roller 56 from the drive transmission device 15 at the timing at which an image forming operation or the like needs to be performed, so that the pressure roller 56 is driven so as to rotate at a predetermined speed in the direction indicated by arrow B1.

When the pressure roller 56 is driven so as to rotate, as illustrated in FIG. 2, the heating belt 53 of the heating unit 55 is driven and rotates in the direction indicated by arrow B2.

In the heating device 5, when an image forming operation is performed, the regions of the heat-generating element 54 of the heating unit 55 in each of which heat is generated are adjusted in accordance with the difference between the width sizes W of the sheets 9 that pass through the contact area FN.

For example, when one of the sheets 9 whose width size W at transportation is the maximum size W1 is caused to pass through the contact area FN, power is supplied to both the first heating portion 542A and the second heating portion 542B such that heat is generated in the region that corresponds to the maximum size W1. When one of the sheets 9 that has the minimum size W3 is caused to pass through the contact area FN, power is supplied to only the third heating portion 542C such that heat is generated in the region that corresponds to the minimum size W3. When one of the sheets 9 that has the intermediate size W2 is caused to pass through the contact area FN, power is supplied to only the first heating portion 542A such that heat is generated in the region that corresponds to the intermediate size W2.

As a result, in the heating device 5, the heat-generating element 54 of the heating unit 55 accommodates variations in the width size W among the sheets 9 and efficiently generates heat.

However, in the heating device 5, for example, in the case where the sheets 9 each of which has one of the width sizes W (including the intermediate size W2 and the minimum size W3) smaller than the maximum size W1 are caused to pass through the contact area FN in a continuous manner so as to be heated, the contact area FN has a region that is a so-called non-sheet-passing area through which the sheets 9 do not pass. Heat generated in this non-sheet-passing area is not absorbed by the sheets 9, and the non-sheet-passing area is kept heated by the portions of the heating portions 542 in each of which heat generation is suppressed, so that the temperature in the non-sheet-passing area may sometimes increase.

In this case, in the contact area FN, the temperature in the non-sheet-passing area becomes locally high, and as a result, the contact holder 61 may sometimes be locally heated and adversely affected, or uneven heating may sometimes be induced.

Thus, in the heating device 5, from the standpoint of suppressing an undesirable increase in the temperature in the non-sheet-passing area, as illustrated in FIG. 2 to FIG. 4, two heat pipes 7A and 7B are arranged so as to be in contact with the surface (rear surface) 541*b* of the heat-generating element 54 of the heating unit 55, which is opposite to the surface 541*a* that is in contact with the heating belt 53. Here, the surface 541*a* of the heat-generating element 54 that is in contact with the heating belt 53 is a portion that also corresponds to a contact portion when the heat-generating element 54 heats the sheets 9 in a contact manner. In addition, the above-mentioned surface (rear surface) 541*b* of the heat-generating element 54 is an example of a portion of the heat-generating element 54 that is different from the contact portion when the heat-generating element 54 heats the sheets 9 in a contact manner.

Each of the heat pipes 7A and 7B is a closed tube formed of a cylinder that is made of a material such as copper or a stainless steel having favorable thermal conductivity and that has two closed ends and includes a body 70 whose inner wall has a capillary structure (so-called wick), and a volatile working fluid (pure water or the like) is sealed in the body 70.

As illustrated in, for example, FIG. 5, each of the heat pipes 7A and 7B has approximately the same length as that of each of the heating portions 542 of the heat-generating element 54. In addition, the heat pipes 7A and 7B are used by being arranged parallel to each other, and thus, heat pipes each having a relatively small diameter (e.g., an outer diameter of a few mm) are used as the heat pipes 7A and 7B.

The heat pipes 7A and 7B are arranged parallel to each other so as to extend in the longitudinal direction of the rear surface 541*b* of the heat-generating element 54 (the same as the widthwise direction D of the sheets 9) and so as to be spaced apart from each other by a predetermined distance in the transport direction C of the sheets 9.

In the exemplary embodiment, as illustrated in, for example, FIG. 4, attachment grooves 65A and 65B for the heat pipes 7A and 7B are formed in the accommodating recess 61*a* of the contact holder 61. The heat pipes 7A and 7B are attached and accommodated in these attached these attachment grooves 65A and 65B, respectively, and then, the heat-generating element 54 is accommodated in the accommodating recess 61*a* such that the rear surface 541*b* of the heat-generating element 54 keeps pressing the heat pipes 7A and 7B. Each of the heat pipes 7A and 7B may be partially bonded and fixed to the rear surface 541*b* of the heat-generating element 54 with a thermally conductive adhesive.

In the heating device 5 in which the heat pipes 7A and 7B are arranged in the manner described above, even if the contact area FN has the non-sheet-passing area, and the temperature in the non-sheet-passing area increases, a heat transfer effect of the heat pipes 7A and 7B enables the heat in a region of the heat-generating element 54 corresponding to the non-sheet-passing area to be transferred to a sheet-passing area of the heat-generating element 54 in which the temperature becomes relatively lower than that in the non-sheet-passing area as a result of the sheets 9 passing therethrough.

As a result, in the heating device 5, an increase in the temperature in the non-sheet-passing area is suppressed compared with the case in which the heat pipes 7A and 7B are not provided.

In addition, in the heating device 5, since the two heat pipes 7A and 7B are arranged parallel to each other on the heat-generating element 54 in such a manner that the heat pipes 7A and 7B are spaced apart from each other in the transport direction C of the sheets 9, compared with the case in which a single heat pipe 7 is provided, an increase in the temperature in the non-sheet-passing area is uniformly and efficiently suppressed on both the front and rear sides of the non-sheet-passing area in the transport direction C of the sheets 9.

Figure 6B:
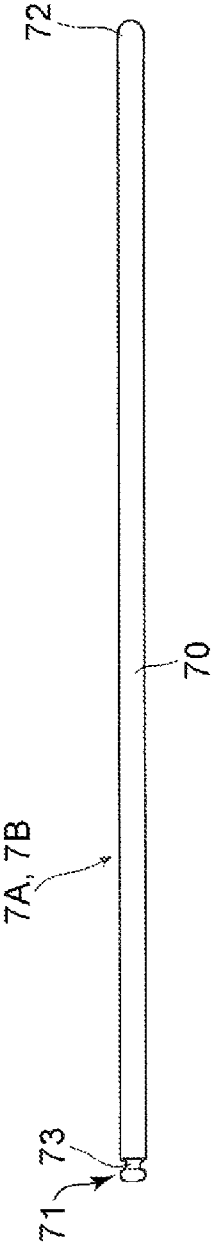

The heat pipes 7A and 7B used in the heating device 5 each includes a crimped portion 73 formed at a first end portion 71 of the body 70 as illustrated in FIG. 6B.

Each of the crimped portions 73 is a portion that is formed through a process of closing a cylindrical end portion by press-deforming and joining the cylindrical end portion in a vacuum, and each of the crimped portions 73 is also a portion that has a thickness smaller than that of the body 70 and a strength lower than that of the body 70. The external shape of each of the crimped portions 73 is not particularly limited. A second end portion 72 of each of the bodies 70 has a closed end shape formed through a joining process such as welding.

On the other hand, when the fixing operation is performed by the heating device 5, the heat pipes 7A and 7B receive a thermal stress from the heat-generating element 54 and a vapor pressure that is generated when the working fluid evaporates.

In the fixing operation performed by the heating device 5, the pressure roller 56 receives the force, which causes the pressure roller 56 to rotate, from the drive transmission device 15 as a result of the power receiving gear 57 engaging the power receiving gear in the drive transmission device 15 and rotates, and the heat-generating element 54 of the heating unit 55 receives a rotational force of the pressure roller 56 via the heating belt 53 in the contact area FN, so that a driving reaction force is generated, which in turn is likely to lead to an increase in the load. As a result, the load is likely to be concentrated also at the crimped portions 73 of the heat pipes 7A and 7B.

Thus, in the case of the heat pipes 7A and 7B that include the crimped portions 73, if the crimped portions 73 keep receiving such thermal stress and vapor pressure, and also the load is concentrated at the crimped portions 73, there is a possibility that breakage of the crimped portions 73 will occur.

Accordingly, in the heating device 5, as illustrated in, for example, FIG. 2, FIG. 3, and FIG. 5, the power receiving gear 57 is disposed on the side on which the second end portions 72 of the heat pipes 7A and 7B are located. In other words, it may be said that each of the heat pipes 7A and 7B is arranged in such a manner that the first end portion 71, at which the crimped portion 73 is formed, is located on the side opposite to the side on which the power receiving gear 57, which is an example of a power input unit, is disposed in the longitudinal direction of the heat-generating element 54.

In this case, the heat pipes 7A and 7B are placed and accommodated in the accommodating recess 61*a* of the contact holder 61 while paying attention to the positions of the crimped portions 73. In addition, as illustrated in FIG. 3 and FIG. 5, the heat pipes 7A and 7B in this case are arranged between the left and right end holders 62A and 62B in such a manner that the two longitudinal ends of each of the heat pipes 7A and 7B are close to the inner surfaces of the end holders 62A and 62B.

Thus, in the heating device 5, even if a driving reaction force is generated in the heat-generating element 54 of the heating unit 55 when the pressure roller 56 rotates as a result of the force that causes the pressure roller 56 to rotate being input thereto via the power receiving gear 57, and a large load is applied to the heat-generating element 54 of the heating unit 55, breakage of the crimped portions 73 of the heat pipes 7A and 7B is suppressed due to load concentrated at the crimped portions 73 is suppressed compared with the case in which the heat pipes 7A and 7B are not arranged such that the crimped portions 73 thereof are located on the side opposite to the side on which the power receiving gear 57, to which power is input, is disposed.

In the heating device 5, as illustrated in, for example, FIG. 5, since the power-supply connection unit 64 is disposed at a position that corresponds to the end of the heating unit 55, the end being located on the upper side (the downstream side in the transport direction C in which each of the sheets 9 is transported from the lower side to the upper side so as to pass through the contact area FN), compared with the case in which the power-supply connection unit 64 is disposed at a position that corresponds to the lower end of the heating unit 55, even if the crimped portions 73 are deformed or broken, and the vapor is leaked out from the crimped portions 73 and is diffused, it is unlikely that the liquid droplets will drip and stay on the power-supply connection unit 64 and induce a short-circuit in the power-supply connection unit 64.

Modifications

Figure 7:
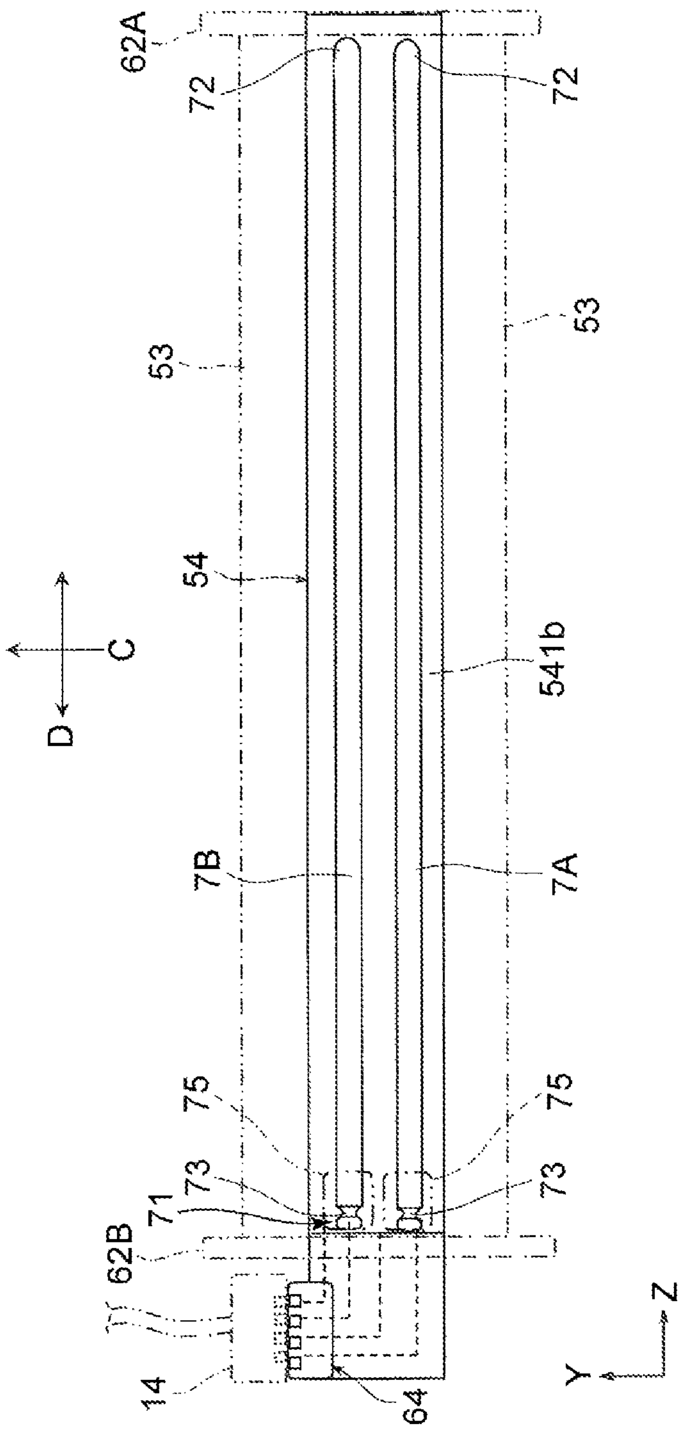
FIG. 7 is a schematic diagram illustrating a principal portion of a heating device according to a modification.

In the heating device 5 according to the exemplary embodiment, as illustrated in FIG. 3 and FIG. 7, hygroscopic members 75 may be provided around the crimped portions 73 of the heat pipes 7A and 7B.

The hygroscopic members 75 may be members that are capable of absorbing the vapor of the working fluid sealed in the heat pipes 7A and 7B when the vapor leaks out from the crimped portions 73 and that also have heat resistance. In addition, each of these members 75 may be disposed in such a manner as to be in contact with or close to a corresponding one of the crimped portions 73 while being disposed in such a manner as not to be in contact with the rear surface 541*b* of the heat-generating element 54.

Although the heating device 5 according to the exemplary embodiment has the configuration example in which the heating unit 55, which is an example of the heating-rotating body 51, and the pressure roller 56, which is an example of the pressurizing-rotating body 52, are arranged side by side in a substantially horizontal direction and configured to rotate by being in contact with each other, the present disclosure is not limited to this configuration.

In other words, the heating device 5 may employ, for example, a configuration in which the heating unit 55 and the pressure roller 56 are arranged one above the other in a substantially vertical direction (the direction of gravity) and configured to rotate by being in contact with each other or a configuration in which the heating unit 55 and the pressure roller 56 are arranged one above the other in an oblique direction so as to be inclined and configured to rotate by being in contact with each other.

The pressurizing-rotating body 52 is not limited to a roll-shaped member, and a belt-nip-type member may be used as the pressurizing-rotating body 52. The drive input unit of the pressurizing-rotating body 52 is not limited to the power receiving gear 57 and may have a different form.

Note that, although the heating device 5 is a heating-and-pressurizing device that includes the pressurizing-rotating body 52, the heating device 5 does not need to include the pressurizing-rotating body 52 as long as a member to be heated is transported in such a manner as to be heated by coming into contact with the heating portion of the heating unit 55. In addition, the heating unit 55 may also treat the heating belt 53 as an example of a member to be heated or a portion of a member to be heated. Furthermore, the heating unit 55 may have a configuration that does not include the heating belt 53. In the heating device 5, the heating belt 53 may be configured to rotate as a result of power being input thereto from the drive transmission device 15 via the power input unit.

The number of the heat pipes 7 arranged in the heating unit 55 may be one or may be three or more. In addition, each of the heat pipes 7 is not limited to having a cylindrical shape and may have, for example, a flat plate-like shape.

Figure 8:
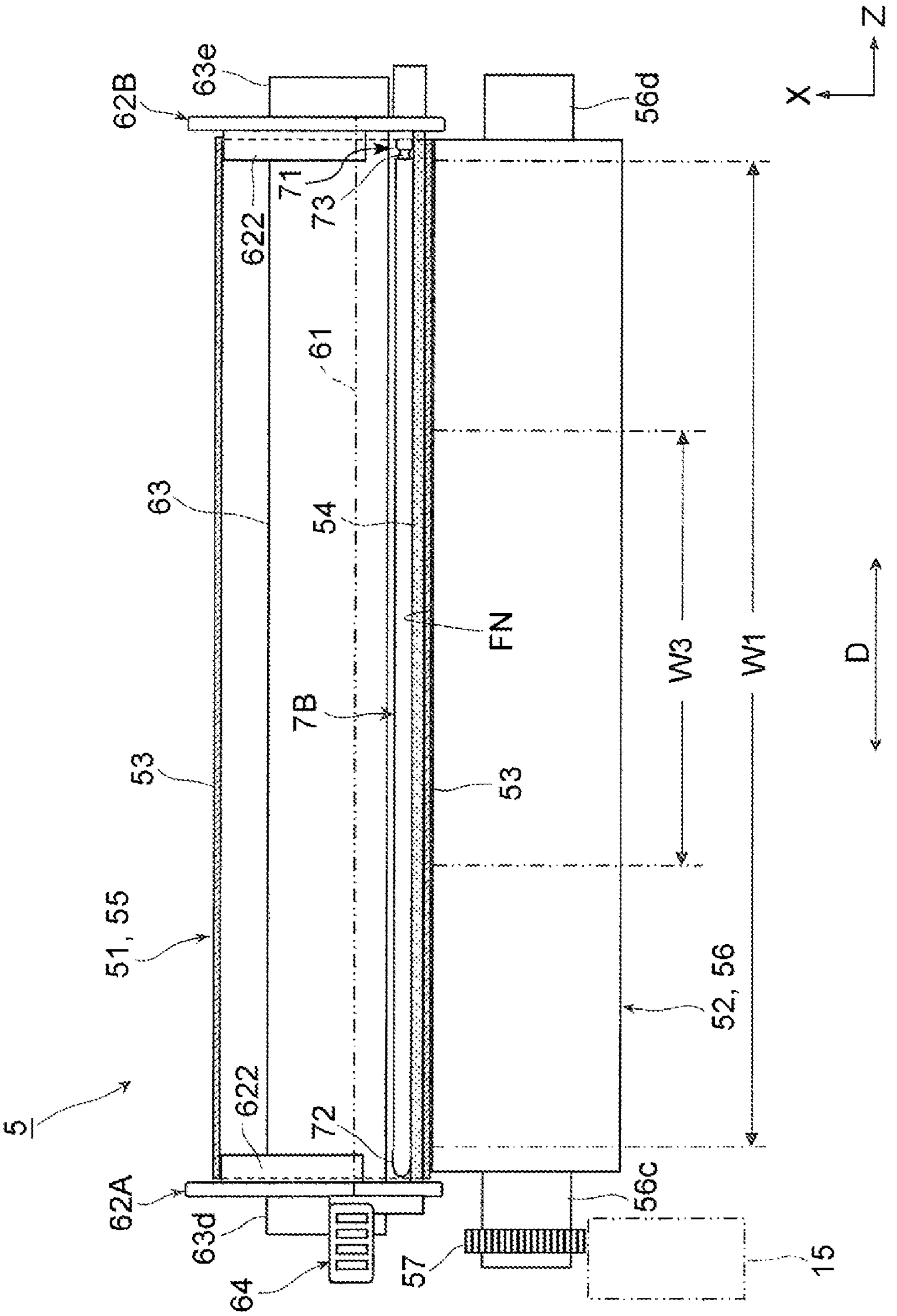
FIG. 8 is a schematic diagram illustrating a heating device according to another modification.

The power-supply connection unit 64 may be positioned outside the left end holder 62A as illustrated in FIG. 8. In other words, the power-supply connection unit 64 may be positioned on the same side on which the power receiving gear 57 of the pressure roller 56, which is an example of a rotating body, is positioned. In this configuration, the crimped portions 73 of the heat pipes 7A and 7B are arranged on the side opposite to the side on which the power-supply connection unit 64 is disposed in the longitudinal direction of the heat-generating element 54, and thus, even if the vapor leaks out from the crimped portions 73, occurrence of a short-circuit in the power-supply connection unit 64 due to the leaked vapor is suppressed.

If there is a circumstance where, for example, it is difficult to ensure an arrangement space for the power-supply connection unit 64, the power-supply connection unit 64 may be disposed at a position corresponding to the lower end of the heating unit 55.

In the exemplary embodiment, although the case has been described in which the heating device 5 is applied to the image forming apparatus 1, the present disclosure is not limited to this case.

In other words, the heating device 5 may be applied to, for example, an apparatus that employs a different image formation system, a sheet drying apparatus (an example of the apparatus using a member to be heated) that heats or dries a sheet transported by a sheet transport unit, or an apparatus (another example of the apparatus using a member to be heated) that is configured to perform a step of heating or drying a sheet-shaped object (an example of the member to be heated) on which no image is to be formed while transporting the sheet-shaped object by a transport unit.

In addition, the image forming apparatus 1 may be an apparatus that forms a polychromatic image formed by combining toners of a plurality of colors, and its form and so forth are not particularly limited.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A heating device comprising:

a heating unit comprising a contact portion having a first surface, configured to heat a member to be heated having a second surface, which is transported, as a result of the contact portion of the heating unit being in contact with the member to be heated;

a heat pipe that is configured to have a first end and a second end opposite to the first end in a widthwise direction, and contact with a portion of the heating unit different from the contact portion in such a manner as to extend in the widthwise direction crossing a transport direction of the member to be heated, wherein the heat pipe includes a crimped portion only disposed at a first end side of the heat pipe;

a rotating body comprising a third surface, configured to rotate in such a manner as to press the member to be heated;

a power input unit, comprising a gear, that is only disposed on a second end side of the heat pipe and that configured to input a rotational force at least to the rotating body; and a power-supply connection unit that is disposed on the first end side of the heat pipe and that is connected to a wiring line through which power is supplied to the heating unit, wherein the crimped portion is located on the first end side opposite to the second end side on which the gear is disposed, wherein the first end of the heat pipe has a thickness smaller than that of the second end.

2. The heating device according to claim 1, further comprising:

a thermally conductive member, wherein the heat pipe is in contact with the heating unit via the thermally conductive member.

* * * * *